United States Patent
Yung

(10) Patent No.: US 7,778,194 B1
(45) Date of Patent: Aug. 17, 2010

(54) EXAMINATION OF CONNECTION HANDSHAKE TO ENHANCE CLASSIFICATION OF ENCRYPTED NETWORK TRAFFIC

(75) Inventor: Weng-Chin Yung, Folsom, CA (US)

(73) Assignee: Packeteer, Inc., Cupertino, CA (US)

( * ) Notice: Subject to any disclaimer, the term of this patent is extended or adjusted under 35 U.S.C. 154(b) by 1127 days.

(21) Appl. No.: 10/917,952

(22) Filed: Aug. 13, 2004

(51) Int. Cl.
*H04L 12/26* (2006.01)

(52) U.S. Cl. .................. 370/252; 370/235; 709/224; 713/151

(58) Field of Classification Search ............... 370/235, 370/252; 713/201; 709/224, 223
See application file for complete search history.

(56) References Cited

U.S. PATENT DOCUMENTS 6,502,131 B1 * 12/2002 Vaid et al. ................. 709/224
2005/0050362 A1 * 3/2005 Peles ........................ 713/201
2005/0063307 A1 * 3/2005 Samuels et al. ............. 370/235
2005/0108571 A1 * 5/2005 Lu et al. .................... 713/201

* cited by examiner

Primary Examiner—Albert T Chou
(74) Attorney, Agent, or Firm—Baker Botts L.L.P.

(57) ABSTRACT

Methods, apparatuses and systems directed to the classification of encrypted network traffic. In one implementation, the present invention facilitates the classification of network traffic that has been encrypted according to a dynamically-created encryption mechanism involving a handshake between two end-systems, such as the SSL and TLS protocols. In one implementation, the present invention observes and analyzes attributes of the handshake between two nodes to enhance the classification of network traffic. In one embodiment, the enhanced classification mechanisms described herein operate seamlessly with other Layer 7 traffic classification mechanisms that operate on attributes of the packets themselves. Implementations of the present invention can be incorporated into a variety of network devices, such as traffic monitoring devices, packet capture devices, firewalls, and bandwidth management devices.

20 Claims, 8 Drawing Sheets

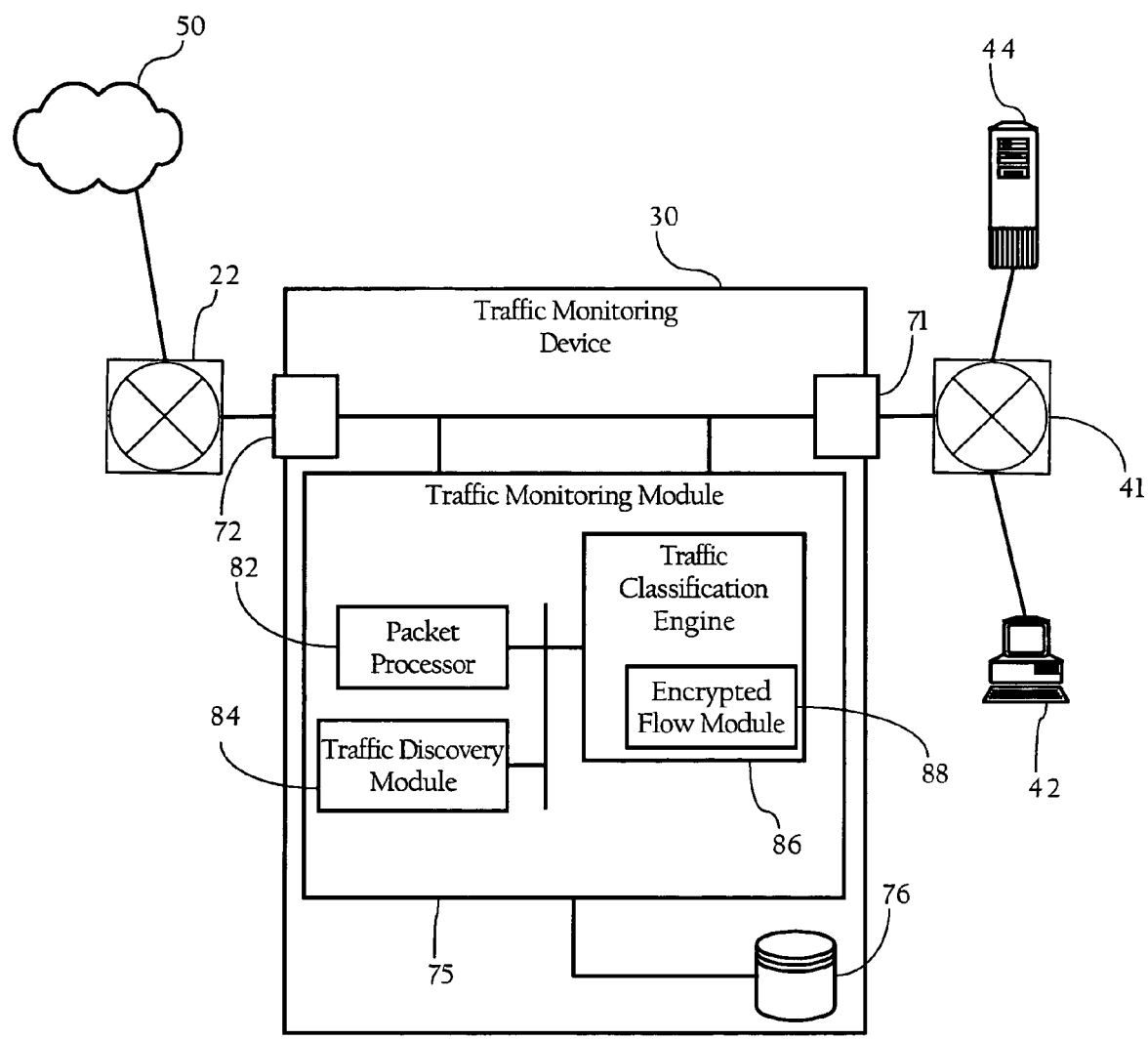
Fig._1

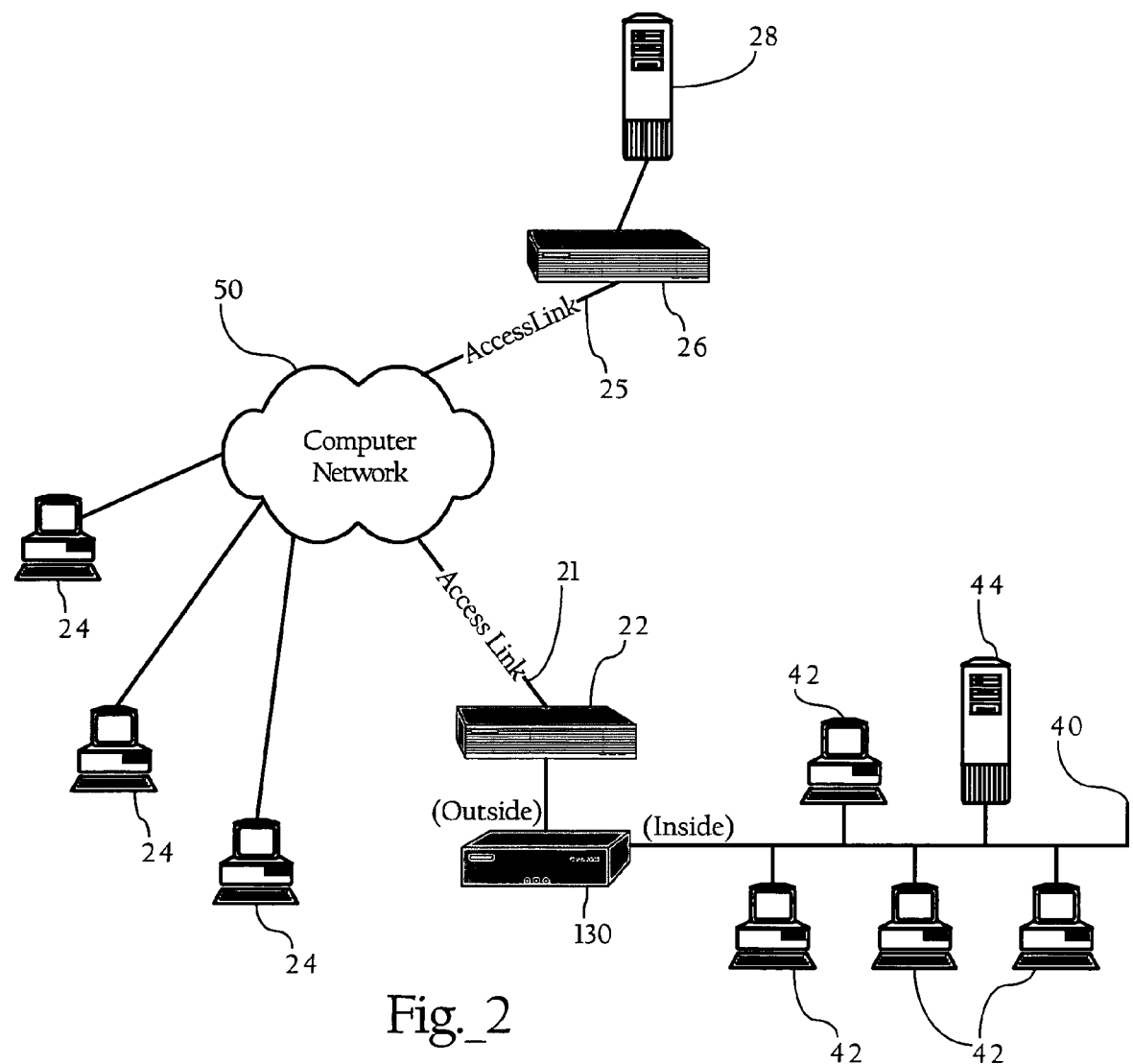
Fig._2

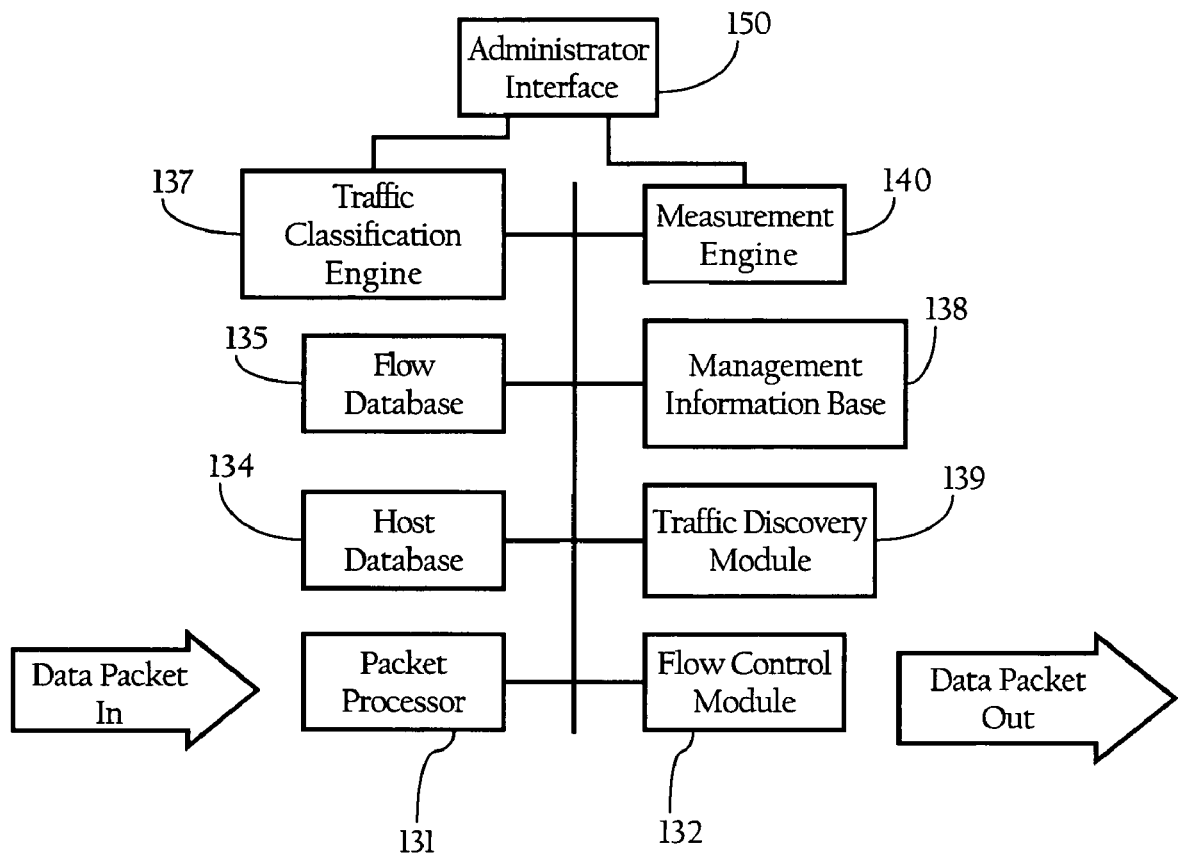
Fig._3

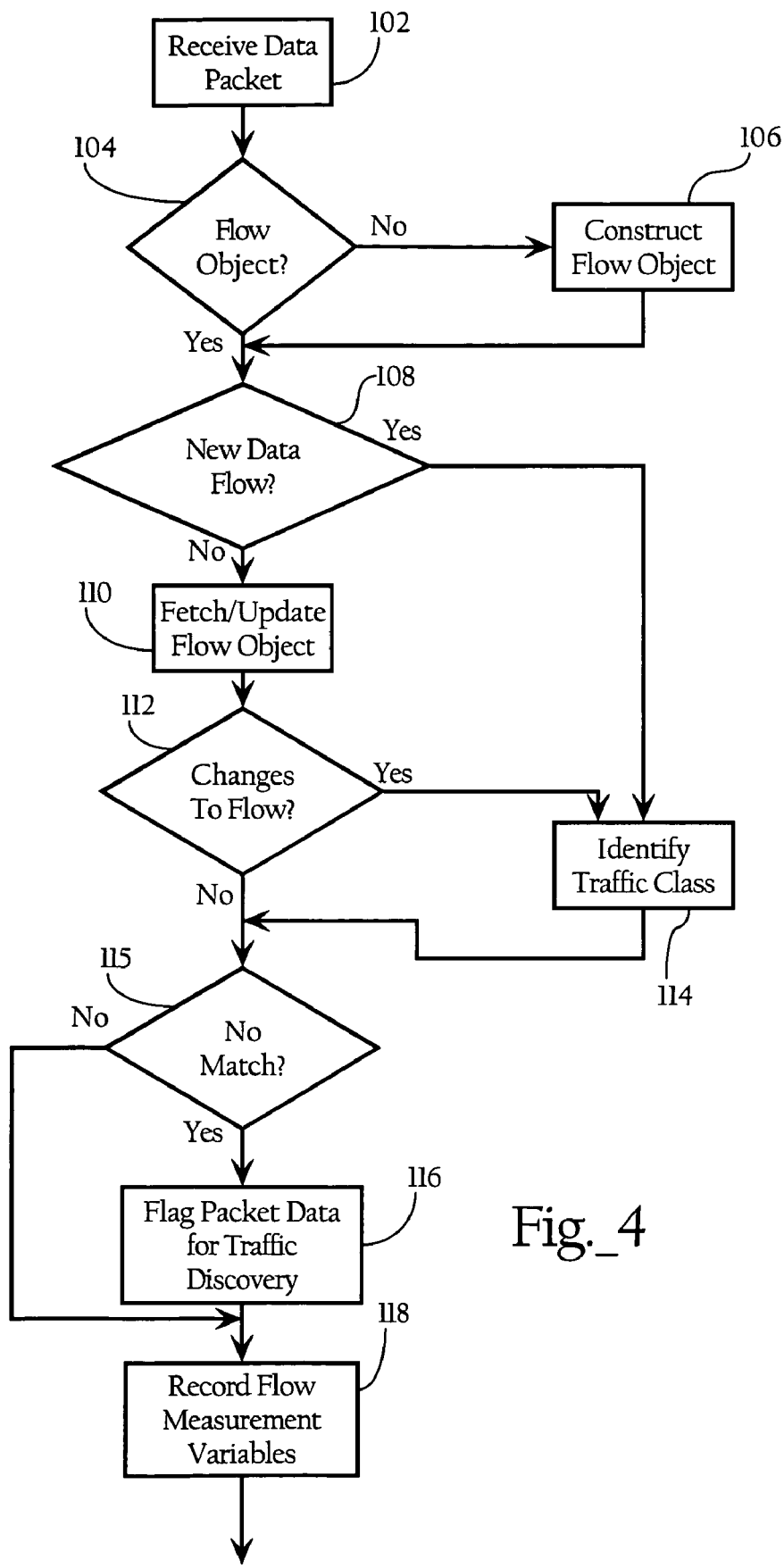
Fig._4

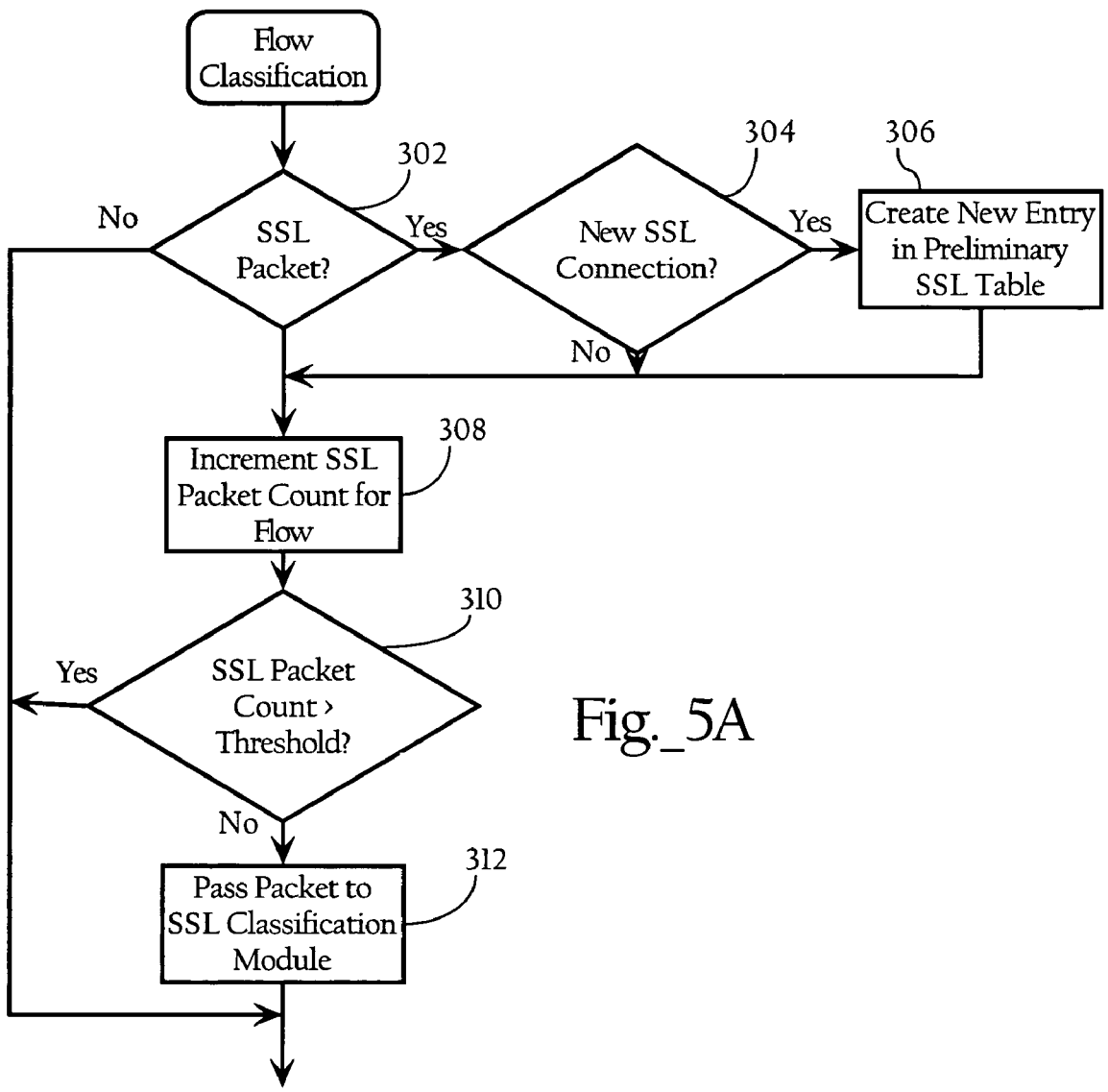
Fig._5A

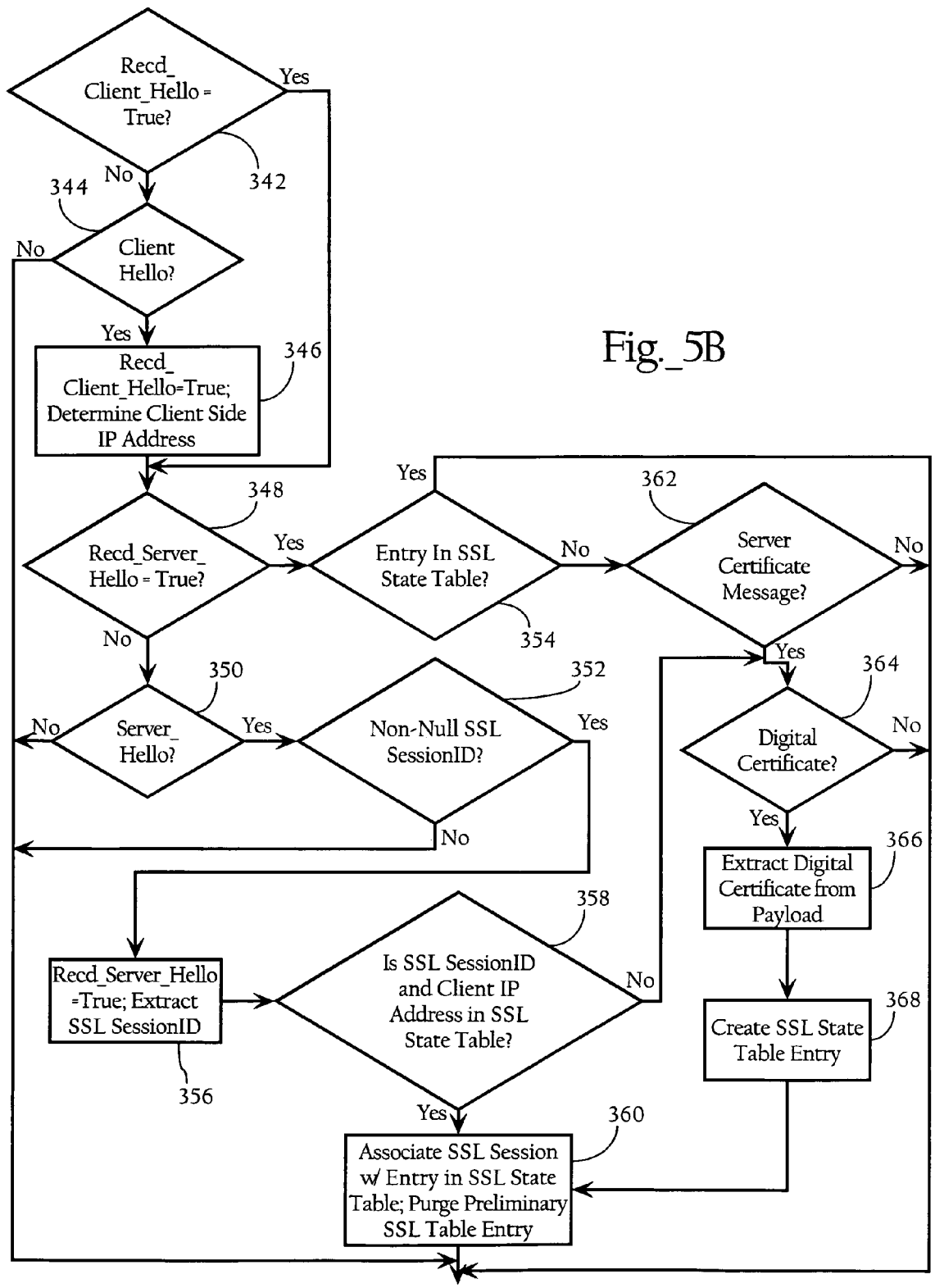
Fig._5B

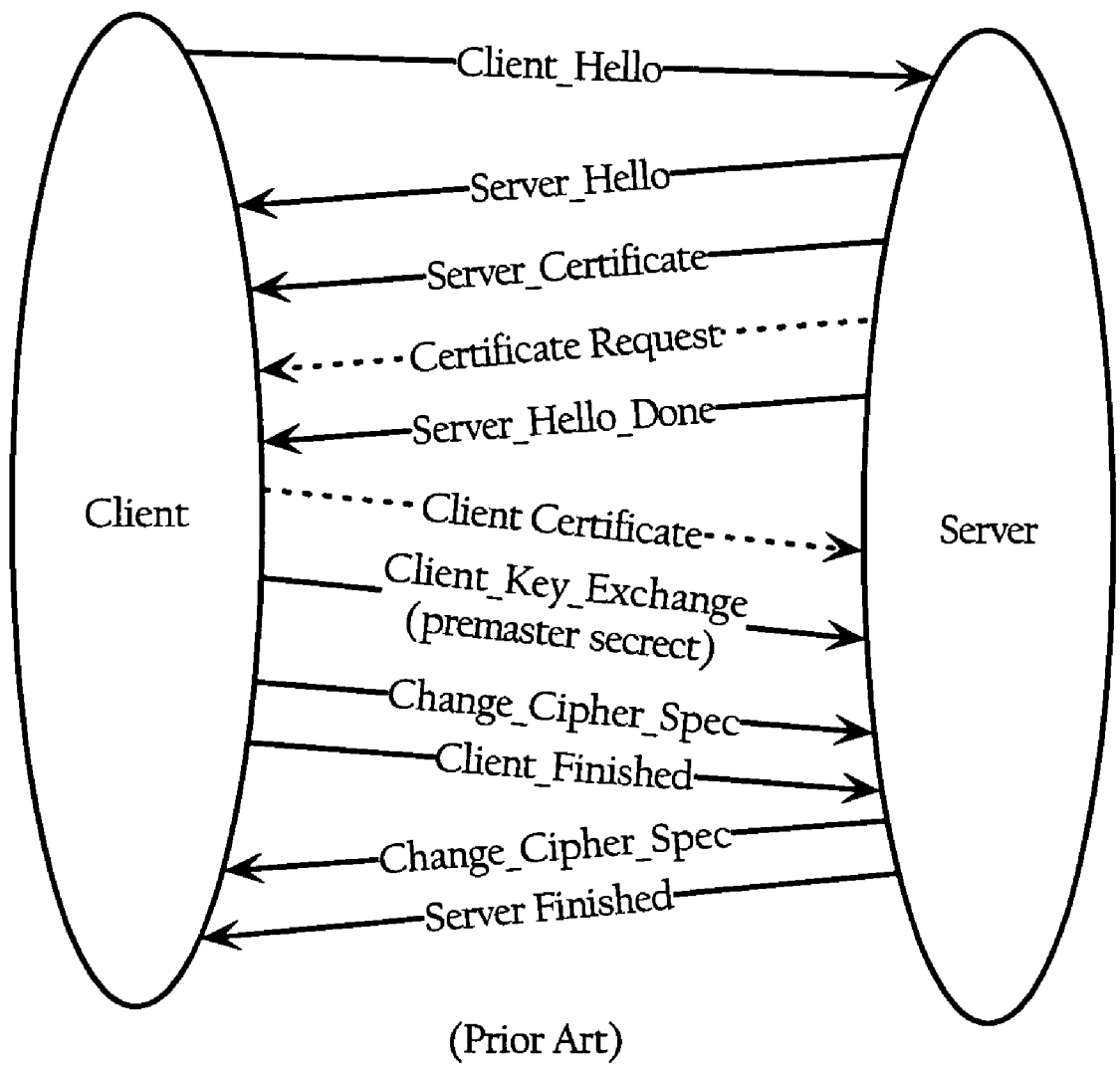
(Prior Art)
Fig._6

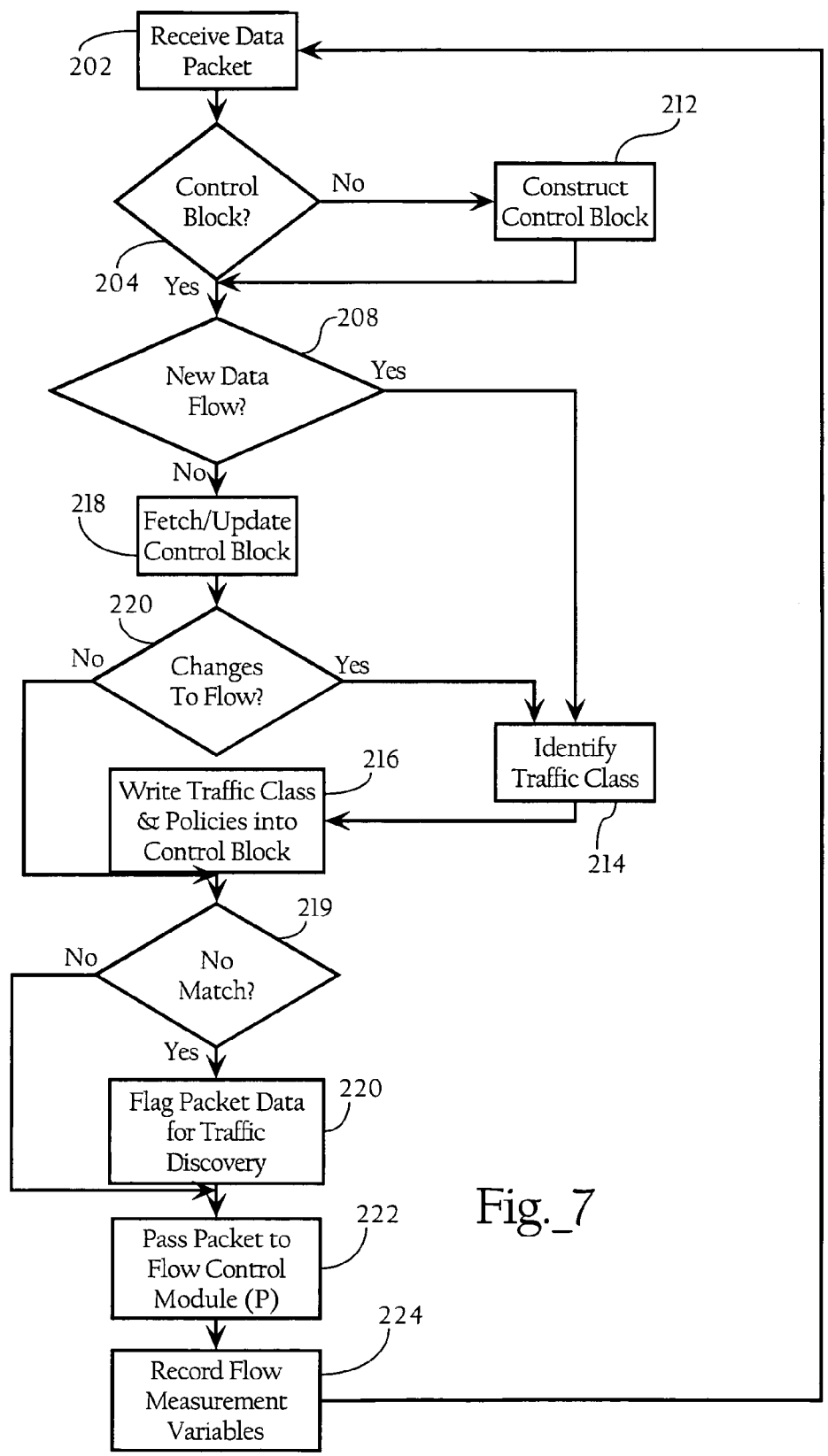
Fig._7

EXAMINATION OF CONNECTION HANDSHAKE TO ENHANCE CLASSIFICATION OF ENCRYPTED NETWORK TRAFFIC

CROSS-REFERENCE TO RELATED APPLICATIONS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates,"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network,"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network,"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network,"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Robert L. Packer, Brett D. Galloway and Ted Thi, entitled "Method for Data Rate Control for Heterogeneous or Peer Internetworking;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/295,391, in the name of Mark Hill, Guy Riddle and Robert Purvy, entitled "Methods, Apparatuses, and Systems Allowing for Bandwidth Management Schemes Responsive to Utilization Characteristics Associated with Individual Users;"

U.S. patent application Ser. No. 10/334,467, in the name of Mark Hill, entitled "Methods, Apparatuses and Systems Facilitating Analysis of the Performance of Network Traffic Classification Configurations;"

U.S. patent application Ser. No. 10/453,345, in the name of Scott Hankins, Michael R. Morford, and Michael J. Quinn, entitled "Flow-Based Packet Capture;" and U.S. patent application Ser. No. 10/611,573, in the name of Roopesh Varier, David Jacobson, and Guy Riddle, entitled "Network Traffic Synchronization Mechanism."

FIELD OF THE INVENTION

The present invention relates to classification of traffic traversing computer networks and, more particularly, to methods, apparatuses and systems that facilitate the classification of encrypted network traffic.

BACKGROUND OF THE INVENTION

Enterprises have become increasingly dependent on computer network infrastructures to provide services and accomplish mission-critical tasks. Indeed, the performance, security, and efficiency of these network infrastructures have become critical as enterprises increase their reliance on distributed computing environments and wide area computer networks. To that end, a variety of network devices have been created to provide data gathering, reporting, and/or operational functions, such as firewalls, gateways, packet capture devices, bandwidth management devices, application traffic monitoring devices, and the like. For example, the TCP/IP protocol suite, which is widely implemented throughout the world-wide data communications network environment called the Internet and many wide and local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

To facilitate monitoring, management and control of network environments, a variety of network devices, applications, technologies and services have been developed. For example, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, certain bandwidth management devices, as well as certain routers, allow network administrators to specify aggregate bandwidth utilization controls to divide available bandwidth into partitions. With some network devices, these partitions can be configured to provide a minimum bandwidth guarantee, and/or cap bandwidth, as to a particular class of traffic. An administrator specifies a traffic class (such as FTP data, or data flows involving a specific user or network application) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (controlling, prioritizing, protecting and/or capping bandwidth for a particular user). In addition, certain bandwidth management devices allow administrators to define a partition hierarchy by configuring one or more partitions dividing the access link and further dividing the parent partitions into one or more child partitions. Furthermore, network security is another concern, such as the detection of computer viruses, as well as prevention of Denial-of-Service (DoS) attacks on, or unauthorized access to, enterprise networks. Accordingly, firewalls and other network devices are deployed at the edge of such networks to filter packets and perform various operations in response to a security threat. In addition, packet capture and other network data gathering devices are often deployed at the edge of, as well as at other strategic points in, a network to allow network administrators to monitor network conditions.

While the systems and methods discussed above that incorporate or utilize traffic classification mechanisms operate effectively for their intended purposes, they possess certain limitations. As discussed more fully below, identification of traffic types associated with data flows traversing a network generally involves the application of matching criteria or rules to explicitly presented or readily discoverable attributes of individual packets, or groups of packets, against an application signature which may comprise a protocol identifier (e.g., TCP, HTTP, UDP, MIME types, etc.), a port number, and even an application-specific string of text in the payload of a packet. Indeed, the rich Layer 7 classification functionality of Packetshaper® bandwidth management devices offered by Packeteer®, Inc. of Cupertino, Calif. is an attractive feature for network administrators, as it allows for accurate identification of a variety of application types.

An increasing number of network applications, however, employ data compression, encryption technology, and/or proprietary protocols that obscure or prevent identification of various application-specific attributes, often leaving well-known port numbers as the only basis for classification. In fact, as networked applications become increasingly complex, data encryption and/or compression has become a touted security or optimization feature. Indeed, data encryption addresses the concern of security and privacy issues, but it also makes it much more difficult for intermediate network devices to identify the applications that employ them. In addition, traffic classification based solely on well-known port numbers can be problematic, especially where a network application uses dynamic port number assignments or incorrectly uses a well-known port number, leading to misclassification of the data flows. In addition, classifying such encrypted network traffic as unknown (or encrypted) and applying a particular rate or admission policy to unknown traffic classes undermines the granular control otherwise provided by bandwidth management devices and, further, may cause legitimate, encrypted traffic to suffer as a result.

The Secure Sockets Layer (SSL) is a commonly-used protocol for managing the security of message transmission on the Internet. Other encryption technologies exist as well. For example, the Transport Layer Security (TLS) protocol, which is based on the SSL protocol, has recently emerged as a possible successor to the SSL protocol. The TLS protocol is described by Dierks Et Allen, "The TLS Protocol Version 1.0," IETF RFC 2246, http://www.ietf.org/rfc/rfc2246.txt (1999), which is incorporated by reference herein. The SSL protocol uses a program layer logically located between the Hypertext Transfer Protocol (HTTP) and Transport Control Protocol (TCP) layers. The SSL protocol runs above TCP/IP and below higher-level protocols such as HTTP or IMAP. It uses TCP/IP on behalf of the higher-level protocols, and in the process allows an SSL-enabled server to authenticate itself to an SSL-enabled client, allows the client to authenticate itself to the server, and allows both machines to establish an encrypted connection. SSL has been incorporated into a variety of network-based applications, such as web-browsers, enterprise software applications, and recreational applications, such as peer-to-peer file sharing applications. The "sockets" part of the term refers to the sockets method of passing data back and forth between a client and a server program in a network. SSL uses public-and-private key encryption, as well as digital certificates. TLS and SSL are an integral part of most Web browsers (clients) and Web servers. If a Web site is on a server that supports SSL, SSL can be enabled and specific Web pages can be identified as requiring SSL access.

The SSL protocol uses a combination of public-key and symmetric key encryption. The SSL protocol includes two sub-protocols: the SSL record protocol and the SSL handshake protocol. The SSL record protocol defines the format used to transmit data, while the SSL handshake protocol involves using the SSL record protocol to exchange a series of messages between an SSL-enabled server and an SSL-enabled client when they first establish an SSL connection. An SSL session always begins with an exchange of messages called the SSL handshake. The SSL handshake allows the server to authenticate itself to the client using public-key techniques, then allows the client and the server to cooperate in the creation of symmetric keys used for encryption, decryption, and tamper detection during the ensuing SSL session. Optionally, the handshake also allows the client to authenticate itself to the server.

The increasing adoption of SSL, TLS and other similar encryption protocols presents certain problems to network devices that employ classification mechanisms to monitor and/or manage network traffic. For example, while the network traffic can be classified as SSL or TLS traffic, sub-classification of such network traffic is problematic as the encryption mechanisms associated with these protocols obscure the higher layer information in the packets and, thus, may prevent further classification into a specific network application or other traffic class. The increasing adoption of such encryption mechanisms is problematic to rich, granular traffic classification mechanisms that are configured, for example, to monitor, or manage, the performance of network applications.

In light of the foregoing, a need in the art exists for methods, apparatuses and systems that facilitate the classification of encrypted network traffic. Embodiments of the present invention substantially fulfill this need.

SUMMARY OF THE INVENTION

The present invention provides methods; apparatuses and systems directed to the classification of encrypted network traffic. In one implementation, the present invention facilitates the classification of network traffic that has been encrypted according to a dynamic encryption mechanism involving a handshake between two end-systems, such as the SSL and TLS protocols, to negotiate the parameters of the encrypted connection. In one implementation, the present invention observes and analyzes attributes of the handshake between two nodes to enhance the classification of network traffic. In one embodiment, the enhanced classification mechanisms described herein operate seamlessly with other Layer 7 traffic classification mechanisms that operate on explicitly-presented attributes of the packets. Implementations of the present invention can be incorporated into a variety of network devices, such as traffic monitoring devices, packet capture devices, firewalls, and bandwidth management devices.

DESCRIPTION OF THE DRAWINGS

FIG. 1 is a functional block diagram showing a traffic monitoring device according to an embodiment of the present invention.

FIG. 2 is a functional block diagram illustrating a computer network environment including a bandwidth management device according to an embodiment of the present invention.

FIG. 3 is a functional block diagram setting forth the functionality in a bandwidth management device according to an embodiment of the present invention.

FIG. 4 is a flow chart diagram providing a method, according to an embodiment of the present invention, directed to the processing of packets in a traffic monitoring device.

FIGS. 5A and 5B are flow chart diagrams illustrating methods, according to an embodiment of the present invention, directed to classifying data flows based on one or attributes of a dynamic encryption protocol handshake.

FIG. 6 is a diagram illustrating the message flow according to the SSL handshake protocol.

FIG. 7 is a flow chart diagram providing a method directed to enforcing bandwidth utilization controls on data flows.

DESCRIPTION OF PREFERRED EMBODIMENT(S)

FIG. 1 illustrates a basic network environment in which an embodiment of the present invention operates. FIG. 1 shows a first network device 41 (such as a hub, switch, router, and/or a variety of combinations of such devices implementing a LAN or WAN) interconnecting two end-systems (here, client computer 42 and server 44). FIG. 1 also provides a second network device 22, such as a router, operably connected to network cloud 50, which in one implementation can be an open, wide-area network. As FIG. 1 shows, traffic monitoring device 30 comprises traffic monitoring module 75, and first and second network interfaces 71, 72, which operably connect traffic monitoring device 30 to the communications path between first network device 41 and second network device 22. Traffic monitoring module 75 generally refers to the functionality implemented by traffic monitoring device 30. In one embodiment, traffic monitoring module 75 is a combination of hardware and software, such as a central processing unit, memory, a system bus, an operating system and one or more software modules implementing the functionality described herein. In one embodiment, traffic monitoring module 75 includes a packet processor 82, and a traffic classification engine 86. In one embodiment, the packet processor 82 is operative to process data packets, such as storing packets in a buffer structure, detecting new data flows, and parsing the data packets for various attributes (such as source and destination addresses, and the like) and maintaining one or more measurement variables or statistics in connection with the flows. The traffic classification engine 86, as discussed more fully below, is operative to classify data flows based on one or more attributes associated with the data flows. Traffic classification engine 86, in one implementation, further includes an encrypted flow module 88 which is operative to monitor and record various attributes of the connection handshake associated with dynamic encryption mechanisms, such as the SSL and TLS protocols. Traffic classification engine 86, in one implementation, can use one or more of the handshake attributes associated with a given data flow to classify the data flow into one of a plurality of traffic classes.

The functionality of traffic monitoring device 30 can be integrated into a variety of network devices that classify network traffic, such as firewalls, gateways, proxies, packet capture devices (see U.S. application Ser. No. 10/453,345), network traffic monitoring and/or application traffic management devices, that are typically located at strategic points in computer networks. In one embodiment, first and second network interfaces 71, 72 are implemented as a combination of hardware and software, such as network interface cards and associated software drivers. In addition, the first and second network interfaces 71, 72 can be wired network interfaces, such as Ethernet interfaces, and/or wireless network interfaces, such as 802.11, BlueTooth, satellite-based interfaces, and the like. As FIG. 1 illustrates, traffic monitoring device 30, in one embodiment, includes persistent memory 76, such as a hard disk drive or other suitable memory device, such writable CD, DVD, or tape drives.

As FIGS. 1 and 2 show, the traffic monitoring device 30 (or application traffic management device 130), in one embodiment, is disposed on the link between a network 40 and router 22. In other embodiments, multiple traffic monitoring devices can be disposed at strategic points in a given network infrastructure to achieve various objectives. In addition, traffic monitoring device 30 need not be directly connected to the link between two network devices, but may also be connected to a mirror port. In addition, the traffic monitoring functionality described herein may be deployed in multiple network devices and used in redundant network topologies by integrating the network traffic synchronization functionality described in U.S. application Ser. No. 10/611,573, incorporated by reference above.

A. Network Traffic Monitoring and Enhanced Traffic Classification

As discussed herein, traffic monitoring device 30 is operative to detect or recognize flows between end systems or hosts, and classify the data flows based on one or more flow attributes. Traffic monitoring device 30 may also monitor and store one or more measurement variables on an aggregate and/or per-traffic-class basis. As discussed below, traffic monitoring device 30, in one implementation, may also be operative to identify or discover the traffic classes corresponding to data flows traversing an access link and add them to the configuration of traffic classification engine 86. As discussed above, traffic discovery allows network administrators to determine the nature of the data flows encountered on a given network. U.S. Pat. Nos. 6,412,000 and 6,457,051 disclose methods and systems that automatically classify network traffic according to a set of classification attributes. In addition, the tracking of measurement variables (such as total throughput, peak or average bandwidth usage, etc.) allows the network administrator to determine the relative significance of the existing traffic classes, as well as newly-discovered traffic, on bandwidth utilization across an access link.

FIG. 4 illustrates a method, according to an embodiment of the present invention, directed to a flow-aware process that classifies data flows and maintains one or more measurement variables based on the identified traffic class. As FIG. 4 illustrates, a packet processor 82 receives a data packet (102) and determines whether a flow object has already been created for the flow to which the data packet is a part (104). A flow object, in one implementation, is a data structure including fields whose values characterize various attributes of the flow, including source and destination IP addresses, port numbers, traffic class identifiers and the like (see Section B.1., below). A flow object can also include other attributes, such as packet count, byte count, first packet time, last packet time, etc. If a flow object is not found, packet processor 82 constructs a new flow object (106). Packet processor 82 then determines whether the received packet is part of an existing flow or a new data flow (108). In one embodiment, flows are generally TCP and UDP flows. However, any suitable transport layer flow can be recognized and detected. In one embodiment, flows are identified based on the following flow attributes: 1) source IP address, 2) destination IP address, 3) source port number, 4) destination port number, and 5) protocol (derived from the "protocol" field in IPv4 headers, and the "Next-Header" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, packet processor 82 can determine a new data flow by detecting SYN and/or SYN/ACK packets. However, a new data flow can simply be a data flow for which there is no corresponding flow object. For example, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another implementation, a background and/or separate process can periodically compare the last packet times associated with a flow to a threshold period of time and deem the flow terminated if the last packet time is beyond the threshold period of time.

If the packet is part of an existing flow, the packet processor 82 associates the packet with the corresponding flow object and updates flow object attributes as required (110). For example, the packet processor 82, in one embodiment, increments the packet count associated with the flow (116). If the packet represents a new data flow, traffic classification engine 86 operates on the flow object and, potentially, attributes of the packet and other packets associated with the flow to determine a traffic type and/or traffic class associated with the flow (114). In one embodiment, the packet (or a pointer to the packet stored in a buffer structure) and the flow object (or a pointer thereto) is passed to the traffic classification engine 86 to determine a traffic class. As discussed in more detail below, identification of a traffic class or type can employ information gleaned from Layers 2 thru 7 of the OSI reference model. The determination of traffic classes is discussed in more detail below at Sections B.1. and B.3. Similarly, if the packet represents a change to the data flow (112), packet processor 82 passes the packet and flow object to the traffic classification engine 86 to determine the traffic class. As FIG. 4 shows, if the data flow does not match an existing traffic class (115), packet processor 82 or traffic classification engine 86 flags the packet for traffic discovery (116). In one embodiment, a data flow that does not match an existing traffic class is classified in the default traffic class. Packet processor 82 or another module then records or updates various measurement variables, such as packet count, byte count, last packet time and the like (118). As discussed above, traffic monitoring device 30 may perform other operations, such as firewall or gateway operations, packet capture operations, and/or bandwidth management functions.

Traffic discovery module 84, in one implementation, operates concurrently with the processing of data flows as described above to discover new traffic classes and add the newly discovered traffic classes to traffic classification engine 86. Traffic discovery module 84, in one implementation operates on packets that have been flagged or otherwise associated with a default traffic class. In one implementation, traffic discovery module 84 automatically discovers traffic classes based on the methods and systems described in U.S. Pat. Nos. 6,412,000, 6,457,051, and 6,591,299 (see above). For example, traffic discovery module 84 can monitor data flows in real time to discover traffic classes in the data flows, or store flagged packets and process the stored packets periodically to discover new traffic classes. As discussed in the above-identified patents, traffic discovery module 84 applies one or more discovery thresholds, such as a minimum byte count, flow count, packet count and the like with or without respect to a fixed or sliding time window in determining whether to add a newly discovered traffic class to traffic classification engine 86.

A.1. Traffic Classification and Encrypted Flow Processing

Traffic classification engine 86, in one implementation, is operative to classify data flows on two different frameworks. That is, traffic classification engine 86 is operative to classify traffic, according to a first framework, based on attributes of individual packets of the data flows that are readily discoverable or unconcealed by encryption or compression. If detected attributes of a given data flow indicates that a dynamic encryption protocol, such as the SSL or TLS protocol, is being employed, traffic classification engine 86 passes the packets associated with the flow to encrypted flow module 88 to monitor various aspects of the SSL or TLS session and record various attributes of the SSL, TLS or other protocol handshake. In one implementation, traffic classification engine 86 is configured to identify SSL or TLS packets by recognizing one or more attributes of the SSL or TLS record layer and examining packets for such attribute(s). Identified SSL or TLS packets are passed to encrypted flow module 88. In one implementation, encrypted flow module 88 detects attributes of a protocol handshake and populates a data structure including fields reserved for attributes of the handshake, such as details of the digital certificate, or selected cipher suites, etc. Traffic classification engine 86, as well as traffic discovery module 84, can then use the attribute values stored in the data structure in addition to, or in lieu of, other flow attributes to classify the data flow. Of course, other implementations are possible. For example, encrypted flow module 88 may operate on data flows as a separate process from traffic classification engine 86. The former arrangement described above may be preferred, in certain implementations where the majority of network traffic is non-encrypted or can otherwise be classified based on non-concealed data flow attributes. Accordingly, the monitoring of connection handshakes and the sub-classification of encrypted flows described below is applied only in cases where the extra processing is required.

According to either framework, a traffic class has at least one attribute defining the criterion(ia) against which data flow attributes are analyzed for the purpose of determining a matching traffic class. For example, a traffic class can be defined by configuring an attribute defining a particular well-known port number in combination with other attributes, including attributes of a SSL or TLS handshake. Of course, a particular traffic class can be defined in relation to a variety of related and/or orthogonal data flow attributes. U.S. Pat. No. 6,412,000 and U.S. patent application Ser. No. 10/039,992 describe some of the data flow attributes that may be used to define a traffic class, as well as the use of hierarchical classification structures to associate traffic classes to data flows. In one embodiment, traffic classification engine 86 includes functionality allowing for classification of network traffic based on information from layers 2 to 7 of the OSI reference model. Traffic classification engine 86, in one embodiment, stores the traffic classes and corresponding data (e.g., matching rules, policies, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet. In one embodiment, the root traffic classifications are "/inbound/" and "/outbound/" data flows. As discussed in U.S. application Ser. No. 10/334,467, traffic classification engine 86, in one implementation, is configured to traverse the hierarchical traffic classification tree, applying the matching rules associated with each traffic class node, in the order in which they are configured. In one embodiment, traffic classification engine 86 attempts to match to a leaf traffic class node before proceeding to remaining traffic class nodes in the hierarchical configuration. If a traffic class is found, the traffic classification database 137 stops the instant search process and returns the identified traffic classification. Any data flow not explicitly classified is classified as "/inbound/default/" or "/outbound/default/". Of course, one skilled in the art will recognize that alternative ways for traversing the hierarchical traffic class configuration can be implemented.

In one implementation, encrypted flow module 88 applies its handshake parsing functionality described herein to data flows classified as /inbound/SSL/ or /outbound/SSL/, or to packets identifying port 443, the well-known port number for SSL traffic. With the content of data packets beyond the transport layer being obscured by encryption or compression algorithms, encrypted flow module 88 parses the handshake portion of the SSL connection in the data flows to allow for classification of the data flow against an application profile. FIG. 6 is a diagram illustrating the message flow between a client and server pursuant to the SSL handshake protocol. To initiate an SSL session, the client sends a client_hello message to which the server responds with a server_hello message. Handshake messages are supplied to the SSL Record Layer, where they are encapsulated within one or more SSLPlaintext structures, which are processed and transmitted as specified by the current active session state. According to the SSL protocol, the client_hello and server_hello messages establish the following SSL connection parameters: Protocol Version, Session ID, Cipher Suite, and Compression Method. Additionally, two random values are generated and exchanged: ClientHello.random and ServerHello.random.

Generally, the server sends its digital certificate immediately following the server_hello message. In some implementations, however, the server certificate may be included in the payload of the server_hello message. Optionally, the server may request a certificate from the client, if that is appropriate to the cipher suite selected. After the these initial messages are transmitted, the server sends a server_hello_done message, indicating that the hello-message phase of the handshake is complete. The server then waits for a client response. If the server has sent a certificate request message, the client sends either a certificate message or a no_certificate alert. The client then sends a client_key_exchange message, the content of which depends on the public key algorithm selected between the client_hello and server_hello messages. At this point, the client sends a change_cipher_spec message, and the client copies the pending Cipher Spec into the current Cipher Spec. The client then immediately sends the finished message. In response, the server sends its own change cipher spec message, transfer the pending to the current Cipher Spec, and send its finished message under the new Cipher Spec. At this point, the handshake is complete and the client and server may begin to exchange application layer data.

When the client and server decide to resume a previous session or duplicate an existing session (instead of negotiating new security parameters) the message flow is as follows: The client sends a client_hello message using the Session ID of the session to be resumed. The server then checks its session cache for a match. If a match is found, and the server is willing to re-establish the connection under the specified session state, it sends a server_hello with the same Session ID value. At this point, both client and server send change_cipher_spec messages and finished messages. Once the SSL session is re-established, the client and server begin to exchange application layer data. If a Session ID match is not found, the server generates a new session ID and the SSL client and server perform a full handshake.

The SSL server certificate generally includes the server's public key, a serial number, a validity period, a common name, the name of the Certificate Authority, as well as the digital signature of the Certificate Authority that issued the digital certificate. The common name is typically composed of a domain name, with or without a host name, and generally look like "www.server.com" or "server.com". SSL server certificates are specific to the common name to which they have been issued at the host level. The common name, however, may take a variety of forms depending on the deployment scenario. For example, the common name may generally be one word, or some other arbitrary identifier, when the digital certificate is used on an intranet or other internal network. In addition, SSL server certificates may also include other fields, such as the purpose for which the certificate was issued.

FIGS. 5A and 5B illustrate methods directed to the classification of data flows, according to an embodiment of the present invention, using attributes of the SSL protocol handshake. One skilled in the art will recognize that the methods described below represent only one of a variety of possible embodiments. Traffic classification engine 86 and encrypted flow module 88, in one implementation, maintain certain data structures that facilitate the handshake parsing and classification operations described herein. In one implementation, traffic classification engine 86 maintains an SSL state table and a preliminary SSL connection table. The SSL state table maintains entries corresponding to existing SSL sessions (i.e., those for which successful handshakes have been completed) detected at traffic monitoring device 30. As discussed herein, traffic classification engine 86 can use data stored in the SSL state table to classify data flows. The preliminary SSL connection table maintains connection state data for a given flow during the handshake or other initial phase of the SSL connection. In one implementation, the data corresponding to a given flow in the preliminary SSL connection table is purged when a corresponding entry in the SSL state table is created. In one implementation, the preliminary SSL connection table and the SSL state table are data structures implemented in a reserved, fixed memory space. Accordingly, when the memory space is full, the least-recently-used entry in the table is overwritten. As the Figures illustrate, traffic classification engine 86 initially detects an SSL or similar connection by examining readily accessible attributes of the packets, and then passes identified SSL packets to encrypted flow module 88 to detect and record certain attributes of the connection handshake. As discussed herein, the detected handshake attributes can then be compared against matching criteria for one or more traffic classes maintained by traffic classification engine 86 (and/or traffic discovery module 84). As the following provides, encrypted flow module 88, in one implementation, is configured to monitor for a selected subset of message types (e.g., client hello messages, server hello messages, server certificate messages, etc.) in the handshake between a client and server, and record various attributes of the packets corresponding to the selected message types.

As FIG. 5A illustrates, when a packet is passed to traffic classification engine 86, it determines whether the packet identifies the SSL protocol (302). In one implementation, packets identifying the well-known port number for SSL traffic is passed to encrypted flow module 88, which verifies whether the packet is an SSL packet. Traffic classification engine 86 can be configured to recognize other encryption protocol types, such as the TLS protocol. In one implementation, traffic classification engine 86 can be configured to recognize elements of packets common to both the TLS and SSL protocols. In addition, encrypted flow module 88 can also be configured to monitor and record various attributes of the handshake involving such protocols in addition to the SSL protocol. For purposes of illustrating an embodiment of the invention, however, operation in connection with the SSL protocol is described. If the packet corresponds to a new SSL connection (304), traffic classification engine 86 creates a new entry in the preliminary SSL connection table (306). In one implementation, the preliminary SSL connection table includes the following fields: 1) inside IP address; 2) outside IP address; 3) client side; 4) SSL sessionID; 5) SSL packet count for the flow; 6) Recd_Client_Hello (a boolean indicating whether the client_hello message has been detected); and 7) Recd_Server_Hello (a boolean indicating whether the client_hello message has been detected). In one embodiment, traffic classification engine 86, upon detection of an SSL packet, compares the source and destination addresses identified in the SSL packet to the IP address pairs in the preliminary SSL connection table. If no matching pairs exist, the packet is deemed to represent a new SSL connection. In this instance, traffic classification engine 86 creates a new entry in the preliminary SSL connection table and adds the inside and outside IP addresses to the entry. Other decisional criteria may also be used. For example, the preliminary SSL connection table may also include a time stamp field indicating the time of arrival of the first detected SSL packet. An SSL packet received after a threshold period of time from the time stamp value is deemed part of a new SSL connection.

As FIG. 5A illustrates, traffic classification engine 86 also maintains an SSL packet flow count, incrementing the SSL packet flow count for a given SSL connection (308) upon detection of a SSL packet. As FIG. 5A also illustrates, traffic classification engine 86, in one implementation, is configured to pass the first N SSL packets associated with a given connection to the encrypted flow module 88 for further classification (310, 312). In one embodiment, the threshold parameter, N, is set to twenty and is applied to SSL packets regardless of the transmission direction. The packets corresponding to the SSL handshake are generally contained in the first group of SSL packets in the flow. Often times, after the handshake, the encrypted packets yield no new, explicitly-presented information that would aid in classification of the data flows. Accordingly, by properly configuring and applying this threshold, only the initial packets, which are generally meaningful in classifying the flow, are passed to encrypted flow module 88 eliminating unneeded processing overhead.

FIG. 5B illustrates a method, according to one implementation of the present invention, implemented by encrypted flow module 88. As FIG. 5B illustrates, encrypted flow module 88 monitors the state of the SSL connection by analyzing packets and modifying entries in the preliminary SSL connection table based on attributes of the packets. When encrypted flow module 88 receives a packet, it accesses the Recd_Client_Hello field for the entry in the preliminary SSL connection table corresponding to the source and destination IP addresses identified in the packet. As discussed above, the Recd_Client_Hello variable is a Boolean value indicating whether a client hello message for a given SSL connection has already been received. If a client_hello message has not been previously detected (342), encrypted flow module 88 examines the packet to determine whether it is a client_hello message (344). Encrypted flow module 88 can perform checks on a variety of packet attributes, and combinations thereof, to verify whether the message is a client_hello message, such as protocol identifiers (e.g., TCP), header lengths, version identifiers, message type identifiers, as well as the length and content data structures in the payload and/or header of the packet. One skilled in the art will recognize that the exact criteria used to identify different message types is a matter of engineering choice and will also depend on the details of the SSL, TLS or other secure communications protocol. If the packet is a client_hello message (344), encrypted flow module 88 sets the recd_client_hello Boolean variable to true and identifies the location of the SSL client relative to traffic monitoring device 30 (346). For a client_hello message, encrypted flow module 88 can identify the client IP address as the source address of the packet. As discussed in Section B.1, infra, traffic monitoring device 30 can identify the inside and outside IP addresses based on the source and destination addresses of the packet and the direction of the packet flow.

If the client_hello message for a given SSL session has already been detected, encrypted flow module 88 monitors for a server_hello message (348, 350). As FIG. 5B shows, encrypted flow module 88, in one implementation, determines whether packets received after the client_hello message are server_hello messages (350). Similar to the detection of client_hello messages, encrypted flow module 88 compares a plurality of packet attributes against a profile that is based on the SSL protocol to determine whether the received packet is a server_hello message. If the packet is identified as a server_hello message, encrypted flow module 88, in one implementation, checks the extracted SSL sessionID to verify that it is a non-null value (352), indicating that no error has occurred. Encrypted flow module 88 then sets recd_server_hello to true, extracts the SSL sessionID from the packet, and adds it to the corresponding entry in the preliminary SSL connection table (356). As discussed above, an SSL client and SSL server may decide to reuse an existing SSL connection. Accordingly, encrypted flow module 88, in one implementation, checks the extracted SSL sessionID and SSL client IP address against the available entries in the SSL state table (358). If a corresponding entry in the SSL state table exists, encrypted flow module 88 associates the SSL session with the existing entry and purges the data in the preliminary SSL connection table (360). In one implementation, encrypted flow module 88 writes the SSL sessionID in the flow control object corresponding to the data flow. As discussed herein, a non-null SSL sessionID value in the flow object is a signal to the traffic classification engine 86 that SSL state data exists for the flow. Encrypted flow module 88, in one implementation, then determines whether the packet payload also includes a server digital certificate (364). If so, encrypted flow module 88 extracts the digital certificate from the packet payload (366) and creates an entry in the SSL state table including attributes of the digital server certificate (368). Otherwise, encrypted flow module 88 monitors the packet flow during the SSL connection handshake for a server certificate message (354, 362).

Traffic classification engine 86 can perform traffic classification operations based on information in the SSL state table, using the SSL sessionID (and possibly the SSL client IP address) stored in the flow control object as a key to find the associated fields. In one implementation, the SSL state table includes the following fields: 1) SSL sessionID, 2) SSL client IP address, and 3) server certificate common name. The SSL state table may also include other fields based on other attributes of the digital server certificate, the digital client certificate, as well as other attributes of the handshake—e.g, selected cipher suites, etc. Accordingly, a variety of traffic classification matching rules can be created based on the information extracted from the packets associated with the SSL handshake. In one implementation, a traffic class can be configured based on the common name identified in the digital certificate, alone or in connection with other attributes, such as protocol identifiers (e.g., TCP, HTTP and the like). The attributes of the handshake, therefore, allow for classification of encrypted network traffic into application-specific classes. With the content of data packets being obscured by encryption, identifying an application signature from the content of the data packets becomes problematic or impossible; however in observing the information carried in the digital certificates presented during the handshake (e.g., the subject name, issuer name, validity period, certificate purpose, etc.), traffic monitoring device 30 can learn a great deal about a particular traffic flow. For example, traffic monitoring device can differentiate a SSL flow corresponding to a banking transaction (for example, the certificate common name may identify "onlinebanking.bank.com") from a SSL flow associated with a peer-to-peer application, such as EarthStation V song downloads (where the certificate common name may be set to "common name"). In addition, implementations of the present invention also address the possible misclassification of data flows where the applications may incorrectly use the well known port number corresponding to SSL flows (port 443).

As one skilled in the art will recognize, the implementation described above uses a variety of threshold values, such as header lengths, protocol identifiers, version numbers to identify message types in the SSL handshake. In addition, one skilled in the art will recognize that the present invention can be adapted to other dynamic encryption technologies, such as the TLS protocol. As discussed above, the matching criteria, therefore, will depend on the details of the underlying encryption technology as detailed in a corresponding specification or protocol definition.

B. Integration of Handshake Attribute Matching into Application Traffic Management Devices As discussed above, the enhanced traffic classification functionality described above, in one embodiment, can be integrated into a bandwidth management device 130 operative to manage data flows traversing access link 21. The above-identified, commonly-owned patents and patent applications disclose the general functionality and operation of bandwidth management devices. FIG. 2 sets forth a packet-based computer network environment including a bandwidth management device 130. As FIG. 2 shows, computer network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and local area network 40. Server 28 is a TCP end system connected to computer network 50 through router 26 and access link 25. Client devices 24 are additional TCP end systems operably connected to computer network 50 by any suitable means, such as through an Internet Services Provider (ISP). The computer network environment, including computer network 50 is a packet-based communications environment, employing TCP/IP protocols, and/or other suitable protocols, and has a plurality of interconnected digital packet transmission stations or routing nodes. Bandwidth management device 130 is provided between router 22 and computer network 40. Bandwidth management device 130 is operative to classify data flows and, depending on the classification, enforce respective bandwidth utilization controls on the data flows to control bandwidth utilization across and optimize network application performance across access link 21.

FIG. 3 is a block diagram illustrating functionality, according to one embodiment of the present invention, included in bandwidth management device 130. In one embodiment, bandwidth management device 130 comprises packet processor 131, flow control module 132, measurement engine 140, traffic classification engine 137, management information base (MIB) 138, traffic discovery module 139, and administrator interface 150. Packet processor 131 is operative to detect new data flows and construct data structures including attributes characterizing the data flow. Flow control module 132 is operative to enforce bandwidth utilization controls on data flows traversing bandwidth management device 130. Traffic classification engine 137 is operative to analyze data flow attributes and identify traffic classes corresponding to the data flows, as discussed more fully below. In one embodiment, traffic classification engine 137, in one implementation, stores traffic classes associated with data flows encountered during operation of bandwidth management device 130, as well as manually created traffic classes and a hierarchical traffic class structure, if any, configured by a network administrator. In one embodiment, traffic classification engine 137 stores traffic classes, in association with pointers to bandwidth utilization controls or pointers to data structures defining such bandwidth utilization controls. Management information base 138 is a database of standard and extended network objects related to the operation of bandwidth management device 130. Traffic discovery module 139 is operative to automatically discover traffic classes based on examination of one or more attributes of the data flows traversing bandwidth management device 130. Measurement engine 140 maintains measurement data relating to operation of bandwidth management device 130 to allow for monitoring of bandwidth utilization across access link 21 with respect to a plurality of bandwidth utilization and other network statistics on an aggregate and/or per-traffic-class level. Bandwidth management device 130, in one embodiment, further includes a persistent data store (not shown), such as a hard disk drive, for non-volatile storage of data.

Administrator interface 150 facilitates the configuration of bandwidth management device 130 to adjust or change operational and configuration parameters associated with the device. For example, administrator interface 150 allows administrators to select identified traffic classes and associate them with bandwidth utilization controls (e.g., a partition, a policy, etc.). Administrator interface 150 also displays various views associated with a hierarchical traffic classification scheme and allows administrators to configure or revise the hierarchical traffic classification scheme. Administrator interface 150 also allows a network administrator to view and configure one or more parameters associated with the handshake attribute matching functionality described herein. Administrator interface 150 can be a command line interface or a graphical user interface accessible, for example, through a conventional browser on client device 42.

B.1. Packet Processing

In one embodiment, when packet processor 131 encounters a new data flow it stores the source and destination IP addresses contained in the packet headers in host database 134. Packet processor 131 further constructs a control block (flow) object including attributes characterizing a specific flow between two end systems. In one embodiment, packet processor 131 writes data flow attributes having variably-sized strings (e.g., URLs, host names, etc.) to a dynamic memory pool. The flow specification object attributes contain attribute identifiers having fixed sizes (e.g., IP addresses, port numbers, service IDs, protocol IDs, etc.), as well as the pointers to the corresponding attributes stored in the dynamic memory pool. Other flow attributes may include application specific attributes gleaned from layers above the TCP layer, such as codec identifiers for Voice over IP calls, Citrix database identifiers, and the like. Packet processor 131, in one embodiment, reserves memory space in the dynamic memory pool for storing such variably-sized attribute information as flows traverse bandwidth management device 130. Packet processor 131 also stores received packets in a buffer structure for processing. In one embodiment, the packets are stored in the buffer structure with a wrapper including various information fields, such as the time the packet was received, the packet flow direction (inbound or outbound), and a pointer to the control block object corresponding to the flow of which the packet is a part.

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980 and U.S. Pat. No. 6,591,299, as well as others incorporated by reference herein, disclose classification of data flows for use in a packet-based communications environment. FIG. 2 illustrates the concept associated with inside and outside addresses. As discussed above, in one embodiment, a flow specification object includes an "inside" and "outside" address relative to bandwidth management device 130. See FIG. 2. For a TCP/IP packet, packet processor 131 can compute the inside and outside addresses based on the source and destination addresses of the packet and the direction of the packet flow.

In one embodiment, packet processor 131 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data (maintained by measurement engine 140) associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 131 hashes the values identified above and scans the hash table for a matching entry. If one exists, packet processor 131 associates the pointer to the corresponding control block object with the data flow. As discussed above, in one embodiment, the control block object attributes further include a packet count corresponding to the number of packets associated with the flow to allow for such operations as the application of policies based on packet counts.

To allow for identification of service types (e.g., FTP, HTTP, etc.), packet processor 131, in one embodiment, is supported by one to a plurality of service identification tables in a relational database that allow for identification of a particular service type (e.g., application, protocol, etc.) based on the attributes of a particular data flow. In one embodiment, a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When bandwidth management device 130 encounters a new flow, packet processor 131 analyzes the data flow against the service attributes in the services table to identify a service ID corresponding to the flow. In one embodiment, packet processor 131 may identify more than one service ID associated with the flow. In this instance, packet processor 131 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor associates the flow with the most specific service ID. A traffic class may be configured to include matching rules based on the service IDs in the services table. For example, a matching rule directed to HTTP traffic may simply refer to the corresponding service ID, as opposed to the individual attributes that packet processor 131 uses to initially identify the service.

In one embodiment, when packet processor 131 inspects a flow it may detect information relating to a second, subsequent flow (e.g., an initial FTP command connection being the harbinger of a subsequent data connection, etc.). Packet processor 131, in response to such flows populates a remembrance table with attributes gleaned from the first flow, such as IP addresses of the connection end points, port numbers, and the like. Packet processor 131 scans attributes of subsequent flows against the remembrance table to potentially associate the subsequent flow with the first flow and to assist in identification of the second flow.

B.2. Flow Control Module

As discussed above, flow control module 132 enforces bandwidth utilization controls (and, in some embodiments, other policies) on data flows traversing access link 21. A bandwidth utilization control for a particular data flow can comprise an aggregate control bandwidth utilization control, a per-flow bandwidth utilization control, or a combination of the two. Flow control module 132 can use any suitable functionality to enforce bandwidth utilization controls known in the art, including, but not limited to weighted fair queuing, class-based weighted fair queuing, Committed Access Rate (CAR) and "leaky bucket" techniques. Flow control module 132 may incorporate any or a subset of the TCP rate control functionality described in the cross-referenced U.S. patents and/or patent applications set forth above for controlling the rate of data flows. Bandwidth management device 130, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention.

B.2.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

B.2.b. Per-Flow Bandwidth Utilization Controls

Flow control module 132 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 132 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class. Other policy types include redirection policies where an inbound request designating a particular resource, for example, is redirected to another server.

B.3. Traffic Classification

A traffic class comprises a set of matching rules or attributes allowing for logical grouping of data flows that share the same characteristic or set of characteristics—e.g., a service ID or type (see Section B.1., above), a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes.

U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, bandwidth management device 130 includes functionality allowing for classification of network traffic based on information from layers 2 to 7 of the OSI reference model. As discussed above, a traffic class may also be defined in relation to the attributes of the handshake associated with an encryption mechanism that a given application employs. As discussed above, the handshake attributes may include attributes of the server and/or client certificates exchanged during the handshake, the encryption or cryptographic technologies advertised in hello messages, and the like.

In one implementation, bandwidth management device 130 allows a network administrator to select from a set of pre-configured traffic classes corresponding to known network applications and add them to the configuration of traffic classification engine 137. Bandwidth management device 130, in one embodiment, allows an administrator to manually create a traffic class by specifying a set of matching attributes. Administrator interface 150, in one embodiment, allows for selection of a traffic class and the configuration of bandwidth utilization (e.g., partition, policy, etc.) and/or other controls/policies (e.g., redirection, security, access control, etc.) for the selected traffic class. Administrator interface 150, in one embodiment, also allows for the selection and arrangement of traffic classes into hierarchical reference trees. In one embodiment, traffic classification engine 137 also stores traffic classes added by traffic discovery module 139.

Traffic classification engine 137 stores traffic classes associated with data flows that traverse access link 21. Traffic classification engine 137, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet.

In one embodiment, the root traffic classifications are "/Inbound" and "/Outbound" data flows. Any data flow not explicitly classified is classified as "/Inbound/Default" or "/Outbound/Default". In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Bandwidth management device 130 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification engine 137 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

B.3.a. Automatic Traffic Classification

As discussed above, traffic discovery module 139, in one implementation, analyzes data flows for which no matching traffic class was found in traffic classification engine 137. Traffic discovery module 139, in one embodiment, is operative to apply predefined sets of matching rules to identify a traffic class corresponding to non-matching data flows. In one implementation, traffic discovery module 139 operates on data flows classified as either /Inbound/Default or Outbound/Default. In one embodiment, traffic discovery module 139 is configured to include a predefined set of traffic classes based upon a knowledge base gleaned from observation of common or known traffic types on current networks. In one embodiment, traffic discovery module 139 creates traffic classes automatically in response to data flows traversing bandwidth management device 130 and stores such traffic classes in traffic classification engine 137. Automatic traffic classification is disclosed in U.S. Pat. Nos. 6,412,000, 6,457,051, and 6,591,299, which are incorporated herein by reference.

As discussed above, traffic discovery module 139 applies one or more traffic discovery thresholds when deciding whether to present or add newly discovered traffic classes. In one embodiment, traffic discovery module 139 must detect a minimum number of data flows within a predefined period for a given traffic type before it creates a traffic class in traffic classification engine 137. In one embodiment, such discovered traffic classes are, by default, attached to or associated with either the "/inbound/autodiscovered/" or "/outbound/autodiscovered/" bandwidth control category, as appropriate. As discussed below, administrator interface 150 allows for configuration of bandwidth controls for auto-discovered traffic classes. In one embodiment, auto-discovered traffic classes are automatically assigned predefined bandwidth utilization controls. U.S. patent application Ser. No. 09/198,051, incorporated by reference herein, discloses automatic assignment of bandwidth utilization controls for discovered traffic classes. Furthermore, as discussed above, traffic discovery module 139 is operative to dynamically adjust one or more traffic discovery thresholds depending on at least one observed parameter or attribute, such as the rate of discovering new traffic classes relative to the number of data flows.

In one implementation, traffic discovery module 139 automatically adds newly discovered traffic classes to traffic classification engine 137, which are presented to the network administrator with manually configured and/or previously discovered traffic classes. In an alternative embodiment, traffic discovery module 139 may save the newly discovered traffic classes in a separate data structure and display them separately to a network administrator. The list may be sorted by any well-known criteria such as: 1) most "hits" during a recent interval, 2) most recently-seen (most recent time first), 3) most data transferred (bytes/second) during some interval, or a moving average. The user may choose an interval length or display cutoff point (how many items, how recent, at least B bytes per second, or other thresholds). The Network manager may then take some action (e.g. pushing a button) to select the traffic types she wishes to add to the classification tree.

B.3.b. Connection Handshake Attribute Matching

The connection handshake attribute matching functionality described above can be integrated into bandwidth management device 130 in a variety of ways. For example, in one implementation, the connection handshake attribute matching functionality can be implemented as an extension (e.g., provided by a plug-in, etc.) to traffic classification engine 137 in one to a plurality of subroutines or modules. For example, traffic classification engine 137 can be configured to include encrypted flow module 88 as described in Section A., above. In another implementation, the connection handshake attribute matching functionality of the present invention may also be implemented as a separate software module. In one implementation, traffic classification engine 137, as well as traffic discovery module 139, can be configured to access the SSL state table when the SSL sessionID in the flow control object is a non-null value.

Furthermore, as discussed above, the connection handshake attribute matching functionality essentially allows for classification of otherwise unknown traffic (beyond being an SSL or other encrypted flow) into one to a plurality of applications or traffic classes. In one implementation, a network administrator may explicitly add one or more of these traffic classes to the configuration of traffic classification engine 137, or by operation of automatic traffic discovery module 139, allow such traffic classes to be added to the configuration of traffic classification engine 137 when data flows associated with a given traffic class is encountered. As discussed above, in one implementation, traffic classification engine 137 can be extended to include encrypted flow module 88 that extracts attributes of the SSL or other protocol handshake for use by other classification processes associated with traffic classification engine 137 and/or traffic discovery module 139. In one implementation, the connection handshake attribute matching functionality is applied only if traffic discovery module 139 fails to identify a traffic class. In another implementation, the enhanced connection handshake attribute matching functionality described herein can be applied only to data flows associated with suspicious activities, as disclosed in U.S. application Ser. No. 10/295,391. As the foregoing illustrates, one skilled in the art will recognize that a variety of configurations are possible with the various configurations presenting tradeoffs between each other.

B.4. Enforcement of Bandwidth Utilization Controls

FIG. 7 illustrates a method, according to one embodiment of the present invention, directed to the enforcement of bandwidth utilization controls on data flows transmitted across access link 21 and, therefore, traversing bandwidth management device 130. The exact method for enforcing bandwidth utilization controls, however, is not critical to the present invention; any suitable method can be employed.

In one embodiment, packet processor 131 receives a data packet (FIG. 7, 202) and determines whether flow database 135 contains an existing control block object corresponding to the data flow (204) (see Section B.1., supra). If no control block object corresponds to the data packet, packet processor 131 constructs a control block object including attributes characterizing the data flow, such as source address, destination address, service type, etc. (212) (see above). In one embodiment, packet processor 131 analyzes the source and destination IP addresses in the packet header and scans host database 134 for matching entries. If no matching entries exist, packet processor 131 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, service type, protocol type, pointers to variable-length information in the dynamic memory pool, and other parameters characterizing the data flow.

If a control block object is found, as FIG. 7 illustrates, packet processor 131 then determines whether the received packet is part of a new data flow (208) or represents a change to an existing data flow (see 218 and 220). Methods for determining new data flows and assigning packets to existing data flows are well known in the art and also depend on the particular transport layer protocol employed. For a TCP packet, packet processor 131 can determine a new data flow by detecting SYN and/or SYN/ACK packets. However, a new data flow can simply be a data flow for which there is no corresponding control block object in flow database 135. In addition, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In one embodiment, if the last packet time does exceed a threshold, this signals to the packet processor 131 that the previous flow has terminated, causing the packet processor 131 to notify FDR emitter 139. In another embodiment, a separate process monitors the last packet times associated with UDP, GRE and similar flow types to detect termination of a given flow. In some embodiments, packet processor 131 may have to encounter multiple packets to identify and fully characterize a new data flow (e.g., identify a service type, traffic class, etc.). For example, U.S. Pat. No. 6,046,980 and U.S. Pat. No. 6,591,299, identified above, discloses methods for classifying packet network flows.

If the data packet does not signify a new data flow, packet processor 131 retrieves the control block object, and associates the packet with the control block object (218). If elements of the data packet represent a change to the traffic type associated with the data flow (220), packet processor 131 passes the flow specification object to traffic classification engine 137 to identify a traffic class corresponding to the flow (214). Methods for determining changes to data flows are also well known in the art. For example, an email may include an attached digital image file. Accordingly, while the initial packets in the data flow may include simple text data, subsequent packets may contain image data. Packet processor 131, in one embodiment, is operative to detect such changes in the characteristics of the data flow by examining data encapsulated in upper layers of each packet, such as the detection of MIME types, etc.

As discussed above, to identify a traffic class associated with the data flow, packet processor 131 passes the control block object (or a pointer to the control block object) to traffic classification engine 137. In one embodiment, the control block object or a copy of it is stored in association with the packet and in the same buffer structure to facilitate access to the control block object by traffic classification engine 137. As discussed in more detail below, traffic classification engine 137 operates on attributes of the control block object and/or flow specification object, (and potentially on the packet stored in the buffer structure, as well as the SSL state table) to identify traffic class(es) associated with the data flow (214). In one embodiment, the control block object in flow database 135 includes a pointer to the identified traffic class(es) in traffic classification engine 137. In one embodiment, the traffic classification engine 137 stores in the control block object the policy parameters (e.g., bandwidth utilization control parameters, security policies, etc.) associated with the identified traffic classes (216). As discussed above, if the data flow does not match an existing traffic class (219), packet processor 82 or traffic classification engine 137 flags the packet for traffic discovery module 139 (220). In one embodiment, a data flow that does not match an existing traffic class is classified in the default traffic class. Traffic discovery module 139 operates on attributes of the data flow to classify it as discussed above. If the identified traffic class exceeds a discovery threshold, traffic discovery module 139, in one implementation, adds the discovered traffic class to traffic classification engine 137. In one implementation, traffic discovery module 139 also writes default bandwidth utilization controls and/or other policies (such as security or redirection policies) into traffic classification engine 137. In another embodiment, newly discovered traffic classes can be added to a separate list, or other data structure, from which a network administrator may elect to add to the traffic classification configuration maintained by traffic classification engine 137.

Packet processor 131 then passes the packet to rate control module 132 (222) which accesses the control block object corresponding to the data flow to retrieve the bandwidth utilization or other controls (e.g., partition, policy, security controls, etc.) associated with the traffic class and enforces the bandwidth utilization controls on the data packet flow. As discussed above, the particular packet flow control mechanism employed is not critical to the present invention. A variety of flow control technologies can be used, such as the flow control technologies disclosed in co-pending and commonly owned application Ser. No. 10/108,085, incorporated herein by reference above, as well as other rate control technologies. As FIG. 7 illustrates, packet processor 131 also records or updates various measurement values in the control block object that characterize the flow (e.g., last packet time, packet count, byte count, etc.) (224). In addition, measurement engine 140, in one embodiment, records data associated with the packet to allow for analysis of bandwidth utilization and other network statistics on a traffic class, access link, and/or partition level.

Lastly, although the present invention has been described as operating in connection with end systems and networks primarily employing the HTTP, TCP and IP protocols, the present invention has application in computer network environments employing any suitable session layer, transport layer and network layer protocols. Moreover, one skilled in the art will recognize that the present invention can be used in connection with handshake matching functionality incorporating a variety of attribute combinations described above. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method facilitating classification of data flows traversing a computer network, comprising detecting, at a network device, a handshake in a data flow between a first node and a second node, wherein the handshake comprises an exchange of messages including information useful to establish an encrypted connection between the first node and the second node, wherein the information includes a digital certificate;

classifying, using the network device, the data flow based on an encrypted connection protocol identified in the exchange of messages;

examining, using the network device, the messages corresponding to the handshake relative to at least one handshake attribute and examining the digital certificate to identify one or more digital certificate attributes, wherein the one or more digital certificate attributes are contained in the digital certificate; and further classifying, using the network device, the data flow into a network-application-specific traffic classification based at least in part on at least one digital certificate attribute of the one or more digital certificate attributes.

2. The method of claim 1 wherein the digital certificate comprises a common name; and wherein the digital certificate attribute comprises the common name of the digital certificate.

3. The method of claim 1 wherein the handshake is a SSL protocol handshake.

4. The method of claim 1 wherein the handshake is a TLS protocol handshake.

5. A method facilitating classification of data flows traversing a computer network, comprising detecting, at a network device, a handshake in a data flow between a first node and a second node, wherein the handshake comprises an exchange of messages that establishes an encrypted connection between the first node and the second node, wherein one or more of the messages includes a digital certificate;

classifying, using the network device, the data flow based on an encrypted connection protocol identified during the handshake;

examining, using the network device, the digital certificate to identify one or more handshake attributes, wherein at least one handshake attribute of the one or more handshake attributes is an attribute of the digital certificate, wherein the one or more digital certificate attributes are contained in the digital certificate; and further classifying, using the network device, the data flow into a network-application-specific traffic classification based at least in part on at least one handshake attribute in the monitoring step.

6. The method of claim 5 wherein the classifying step comprises matching the data flow to a traffic class from a plurality of traffic classes, wherein at least one traffic class in the plurality of traffic classes is defined at least in part by a handshake attribute.

7. An apparatus comprising a packet processor operative to detect data flows in network traffic traversing a communications path, the data flows each comprising at least one packet;

parse at least one packet associated with a data flow into a flow specification, a traffic classification engine operative to classify the data flow based on an encrypted connection protocol identified during a handshake between a first host and a second host;

identify handshake packets of the data flow, wherein one or more of the handshake packets includes a digital certificate; and examine the digital certificate for one or more handshake attributes, wherein at least one handshake attribute is an attribute contained in the digital certificate;

further classify the data flow by matching the data flow against a plurality of traffic classes, at least one of the traffic classes defined by the attribute of the digital certificate;

having found a matching traffic class, associate the flow specification corresponding to the data flow with a traffic class from the plurality of traffic classes.

8. The apparatus of claim 7 wherein at least one of the plurality of traffic classes is defined by one or more matching attributes, wherein said matching attributes are explicitly presented in the packets associated with the data flows.

9. The apparatus of claim 8 wherein said flow specification contains, and wherein the one or more matching attributes include, at least one instance of any one of the following: a protocol family designation, a direction of packet flow designation, a protocol type designation, a pair of hosts, a pair of ports, a pointer to a MIME type, a digital certificate common name, and a pointer to an application-specific attribute.

10. The apparatus of claim 7 wherein said flow specification contains at least one instance of any one of the following: a protocol family designation, a direction of packet flow designation, a protocol type designation, a pair of hosts, a pair of ports, a pointer to a MIME type, a digital certificate common name, and a pointer to an application-specific attribute.

11. The apparatus of claim 7 further comprising
a flow control module operative to apply bandwidth utilization controls to the data flows based on the traffic class associated with the data flows.

12. The apparatus of claim 7 wherein the digital certificate comprises a common name; and wherein the handshake attribute comprises the common name of the digital certificate.

13. The apparatus of claim 7 wherein the handshake packets are formatted according to the SSL protocol.

14. The apparatus of claim 7 wherein the handshake packets are formatted according to the TLS protocol.

15. A method facilitating classification of data flows, comprising
detecting, at a network device, a data flow in network traffic traversing a communications path, the data flows each comprising at least one packet;
parsing, using the network device, explicit attributes at least one packet associated with the data flow into a flow specification,
detecting, at the network device, a handshake in a data flow between a first node and a second node, wherein the handshake comprises an exchange of messages including information useful to establish an encrypted connection between the first node and the second node, wherein the information includes a digital certificate;
classifying, using the network device, the data flow based on an encrypted connection protocol identified during the handshake;
examining, using the network device, the messages corresponding to the handshake to identify the digital certificate;
examining, using the network device, the digital certificate to identify one or more handshake attributes;
further classifying, using the network device, the data flow by matching the flow specification against a first plurality of traffic classes, wherein at least one of the first plurality of traffic classes is defined in part by a handshake attribute that is an attribute contained in the digital certificate,
having found a matching traffic class, associating the flow specification corresponding to the data flow with a traffic class from the first plurality of traffic classes.

16. The method of claim 15 wherein the flow specification contains at least one instance of any one of the following: a protocol family designation, a direction of packet flow designation, a protocol type designation, a pair of hosts, a pair of ports, a pointer to a MIME type, and a pointer to an application-specific attribute.

17. The method of claim 15 wherein said flow specification contains, and wherein the one or more matching attributes include, at least one instance of any one of the following: a protocol family designation, a direction of packet flow designation, a protocol type designation, a pair of hosts, a pair of ports, a pointer to a MIME type, and a pointer to an application-specific attribute.

18. The method of claim 15 wherein the digital certificate comprises a common name; and wherein the handshake attribute comprises the common name of the digital certificate.

19. The method of claim 15 wherein the handshake is a SSL protocol handshake.

20. The method of claim 15 wherein the handshake is a TLS protocol handshake.

* * * * *